United States Patent
Seto et al.

(10) Patent No.: US 10,067,925 B2
(45) Date of Patent: *Sep. 4, 2018

(54) MAPPING ACCOUNT INFORMATION TO SERVER AUTHENTICATION

(71) Applicant: Microsoft Technology Licensing, LLC, Redmond, WA (US)

(72) Inventors: Julie Seto, Duvall, WA (US); Evan Stavrou, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/485,630

(22) Filed: Apr. 12, 2017

(65) Prior Publication Data

US 2018/0024980 A1    Jan. 25, 2018

Related U.S. Application Data

(63) Continuation of application No. 14/482,043, filed on Sep. 10, 2014, now Pat. No. 9,658,996.

(51) Int. Cl.
| | |
|---|---|
| *H04L 29/06* | (2006.01) |
| *G06F 17/24* | (2006.01) |
| *G06F 21/31* | (2013.01) |
| *H04W 12/06* | (2009.01) |
| *H04W 88/02* | (2009.01) |

(52) U.S. Cl.
CPC ............ *G06F 17/243* (2013.01); *G06F 21/31* (2013.01); *H04L 63/083* (2013.01); *H04W 12/06* (2013.01); *H04W 88/02* (2013.01)

(58) Field of Classification Search
None
See application file for complete search history.

(56) References Cited

U.S. PATENT DOCUMENTS

| | | |
|---|---|---|
| 5,559,947 A | 9/1996 | Wugofski |
| 5,768,519 A | 6/1998 | Swift et al. |
| 6,092,199 A | 7/2000 | Dutcher et al. |
| 6,182,229 B1 * | 1/2001 | Nielsen .................. G06F 21/41 |
| | | 713/170 |
| 7,577,659 B2 | 8/2009 | Schutz et al. |
| (Continued) | | |

FOREIGN PATENT DOCUMENTS

CN    103036899 A    4/2013

OTHER PUBLICATIONS

"What is the OpenID account chooser?", Retrieved on: Jun. 24, 2014, Available at: https://www.accountchooser.com/learnmore.html.

(Continued)

*Primary Examiner* — Farid Homayounmehr
*Assistant Examiner* — Olanrewaju J. Bucknor
(74) *Attorney, Agent, or Firm* — Christopher J. Volkmann; Kelly, Holt & Christenson, PLLC

(57) ABSTRACT

An authorization prompt issued from a server is detected, and previously-entered account information, is accessed on a user device. A selectable display element corresponding to each set of entered account information is displayed. User selection or actuation of a given display element is received, and the corresponding account information is retrieved and used to log onto the server that issued the authentication prompt.

20 Claims, 17 Drawing Sheets

(56) References Cited

U.S. PATENT DOCUMENTS

| | | | |
|---|---|---|---|
| 7,676,829 B1* | 3/2010 | Gui | G06F 21/31 726/5 |
| 7,810,143 B2 | 10/2010 | Ruzyski et al. | |
| 7,886,000 B1 | 2/2011 | Polis et al. | |
| 8,069,166 B2 | 11/2011 | Alvarado et al. | |
| 8,229,959 B1 | 7/2012 | Yagnik | |
| 8,566,248 B1* | 10/2013 | Steele | G06Q 10/00 705/325 |
| 8,572,696 B1* | 10/2013 | Wiacek | H04W 4/02 380/247 |
| 8,910,262 B2* | 12/2014 | Mayblum | H04L 63/10 713/168 |
| 9,118,673 B2* | 8/2015 | Wells | H04L 63/0838 |
| 9,172,699 B1 | 10/2015 | Vazquez et al. | |
| 2002/0059210 A1 | 5/2002 | Makus et al. | |
| 2004/0030934 A1 | 2/2004 | Mizoguchi et al. | |
| 2008/0209336 A1 | 8/2008 | Brown et al. | |
| 2009/0144812 A1 | 6/2009 | Sasamura et al. | |
| 2010/0064230 A1 | 3/2010 | Klawitter et al. | |
| 2010/0325715 A1 | 12/2010 | Deurbrouck et al. | |
| 2011/0265173 A1* | 10/2011 | Naaman | G06F 21/41 726/8 |
| 2012/0109882 A1* | 5/2012 | Bouse | G06Q 10/10 707/607 |
| 2012/0159612 A1* | 6/2012 | Reisgies | G06F 21/41 726/18 |
| 2013/0067329 A1 | 3/2013 | Patali et al. | |
| 2013/0133062 A1* | 5/2013 | Boss | G06F 17/243 726/18 |
| 2013/0254856 A1* | 9/2013 | Krishan | H04L 63/083 726/6 |
| 2014/0189808 A1 | 7/2014 | Mahaffey et al. | |
| 2015/0288522 A1 | 10/2015 | McCoy et al. | |
| 2016/0119313 A1* | 4/2016 | Zhang | H04L 63/083 726/6 |

OTHER PUBLICATIONS

Mariotti, Gabriele, "Snippet: Google Picker Account", Published on: Mar. 14, 2013, Available at: http://gmariotti.blogspot.in/2013/03/snippet-google-picker-account.html.

Bjarnadottir, Emma Run, "Account Timesheet", Retrieved on: Jun. 24, 2014, Available at: https://tempoplugin.jira.com/wiki/display/TEMPO/Account+Timesheet.

Azzola, Francesco, "Android navigation drawer—Account picker", Published on: Jun. 5, 2013, Available at: http://www.survivingwithandroid.com/2013/06/navigation-drawer-with-account-picker.html.

"Windows Mobile—Messaging application account picker screen option", Published on: Aug. 14, 2007, Available at: http://www.mydigitallife.us/2007/08/windows-mobil-2.html.

International Search Report and Written Opinion for International Application No. PCT/US2015/048754, dated Dec. 1, 2015, date of filing: Sep. 7, 2015, 12 pages.

"Final Office Action Issued in U.S. Appl. No. 14/482,043", dated Sep. 9, 2016, 22 Pages.

"Non-Final Office Action Issued in U.S. Appl. No. 14/482,043", dated Feb. 25, 2016, 20 Pages.

"Notice of Allowance Issued in U.S. Appl. No. 14/482,043", dated Feb. 13, 2017, 20 Pages.

YouTube. "LastPass Tutorial", Apr. 10, 2014, https://www.youtube.com/watch?v=iD0WL9Cjhcs, 2 Pages.

YouTube. "LastPass for Android Review", Mar. 31, 2014. https://www.youtube.com/watch?v=f9Y4n9e1Zj8, 2 pages.

* cited by examiner

MAPPING ACCOUNT INFORMATION TO SERVER AUTHENTICATION

CROSS-REFERENCE TO RELATED APPLICATION

The present application is a continuation of and claims priority of U.S. patent application Ser. No. 14/482,043, filed Sep. 10, 2014, the content of which is hereby incorporated by reference in its entirety.

BACKGROUND

Computer systems are currently in wide use. Many computer systems use an authentication mechanism for users to access certain information.

For instance, users often use computers (such as desktop computers, laptop computers, mobile devices, etc.) to access information on various servers. In accessing information on various servers, users often employ a relatively small set of credentials to connect to all of the different servers. Many authentication systems require the user to enter username and password information (e.g., account information) repeatedly (e.g., for each different server) in order to access information on the different servers. This can lead to a relatively unsatisfactory user experience.

Mobile devices are also currently in wide use. Mobile devices often have a relatively small display screen. This can exacerbate the problems associated with repeatedly entering passwords. It is difficult to accurately enter passwords on small screen devices and this leads to the user experience suffering even more.

Cloud computing is also currently in wide use. The problems associated with repeatedly entering account information are exacerbated as users increase their utilization of cloud computing. For instance, a user may have a document management system on one cloud (or in one remote server environment) and have an electronic mail system on another cloud (or in another remote server environment). This can mean that the user must repeatedly enter credentials in order to access documents, access e-mails, etc.

The discussion above is merely provided for general background information and is not intended to be used as an aid in determining the scope of the claimed subject matter.

SUMMARY

An authorization prompt issued from a server is detected, and previously-entered account information, is accessed on a user device. A selectable display element corresponding to each set of previously entered account information is displayed. User selection or actuation of a given display element is received, and the corresponding account information is retrieved and used to log onto the server that issued the authentication prompt.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2-1 and 2-2 (collectively FIG. 2) show a flow diagram illustrating one example of the operation of an account picker system.

DETAILED DESCRIPTION

Figure 1:
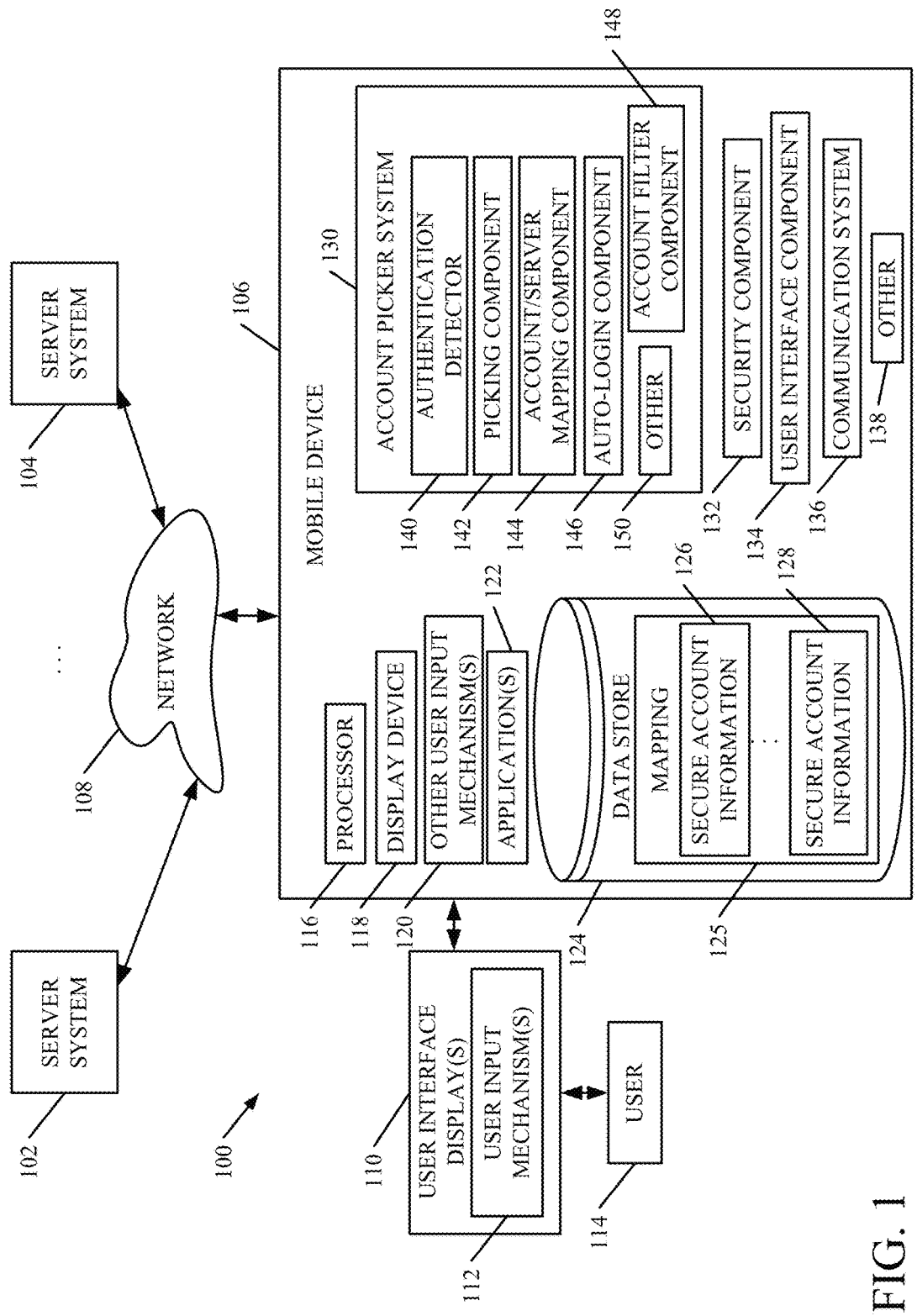
FIG. 1 is a block diagram of one example of a multi-server architecture.

FIG. 1 is a block diagram of one example of a multiple server architecture 100. Architecture 100 illustratively includes a set of different server systems 102-104. Each different server system can have one or more servers that host various applications, sites, systems, etc.

FIG. 1 also shows mobile device 106 that accesses server systems 102-104 over network 108. User device 106 illustratively generates user interface displays 110 with user input mechanisms 112 for interaction by user 114. User 114 illustratively interacts with user input mechanisms 112 in order to control and manipulate mobile device 106, and in order to access information on server systems 102-104.

In the example shown in FIG. 1, mobile device 106 illustratively includes processor 116, display device 118, other user input mechanisms 120 (such as buttons, touch screens, switches, etc.), applications 122, data store 124 (which illustratively includes a mapping 125 and a plurality of different sets of server account information 126-128), account picker system 130, security component 132, user interface component 134, communication system 136, and it can include other items 138 as well. Before describing the overall operation of architecture 100 in more detail, a brief overview of some of the items in architecture 100 will first be provided.

Processor 116 in mobile device 108 illustratively runs applications 122 that allow user 114 to access information on different server systems 102-104. For instance, the applications 122 can be client applications that allow user 114 to access word processing documents, presentation documents, spreadsheet documents, notes, or a wide variety of other information, from a document management system deployed on one of server systems 102-104. Applications 122 can also illustratively include messaging applications that allow user 114 to access a messaging system deployed on another server system 102-104 (such as an e-mail system, etc.). In one example, user 114 has at least one set of account information that the user 114 needs to enter when accessing information on each server system 102-104. The account can include account information, such as a username and password, or other authentication information.

Communication system 136 illustratively allows user 114 to employ mobile device 106 to communicate with other users. The communication system can be a cellular communication system, various types of messaging systems, among others. More examples of these are described below with respect to FIG. 5.

Account picker system 130 illustratively includes authentication detector 140, picking component 142, account/server mapping component 144, auto-login component 146, account filter component 148, and it can include other items 150 as well. When authentication detector 140 detects that the user is being prompted for authentication information from a given server, picking component 142 accesses a mapping 125 in data store 124 to determine whether user 114 has already associated any account information with the given server that issued the authentication prompt. If so, picking component 142 accesses the associated account information and uses it to authenticate with that server. Should that fail (because the account information is invalid, or because there is no valid mapping to account information to that server), then user interface component 134 generates a user interface display for user 114, listing the various sets of account information that user 114 has previously entered to choose from in order to authenticate. In one example, account filter component 148 can filter that account information based on a variety of filter criteria, some of which are described below. User 114 can then simply select a set of account information to use to log into the given server, and auto-login component 148 automatically logs in, through the authentication prompt, to the given server, using the account information selected by the user. The selected account information is then mapped to that server in mapping 125. The account information can include credentials, account number, user name, password and/or other information.

Where the user 114 has not associated any account information with any servers, or when the user would like to enter entirely new credentials, account/server mapping component 144 can generate user interface displays that allow the user to do this. It can also allow the user to input new account information which can be transformed into a secure form by security component 132. For instance, component 132 can encrypt the account information and store it in mapping 125 (or elsewhere) as a set of secure account information.

Figures 1, 2:
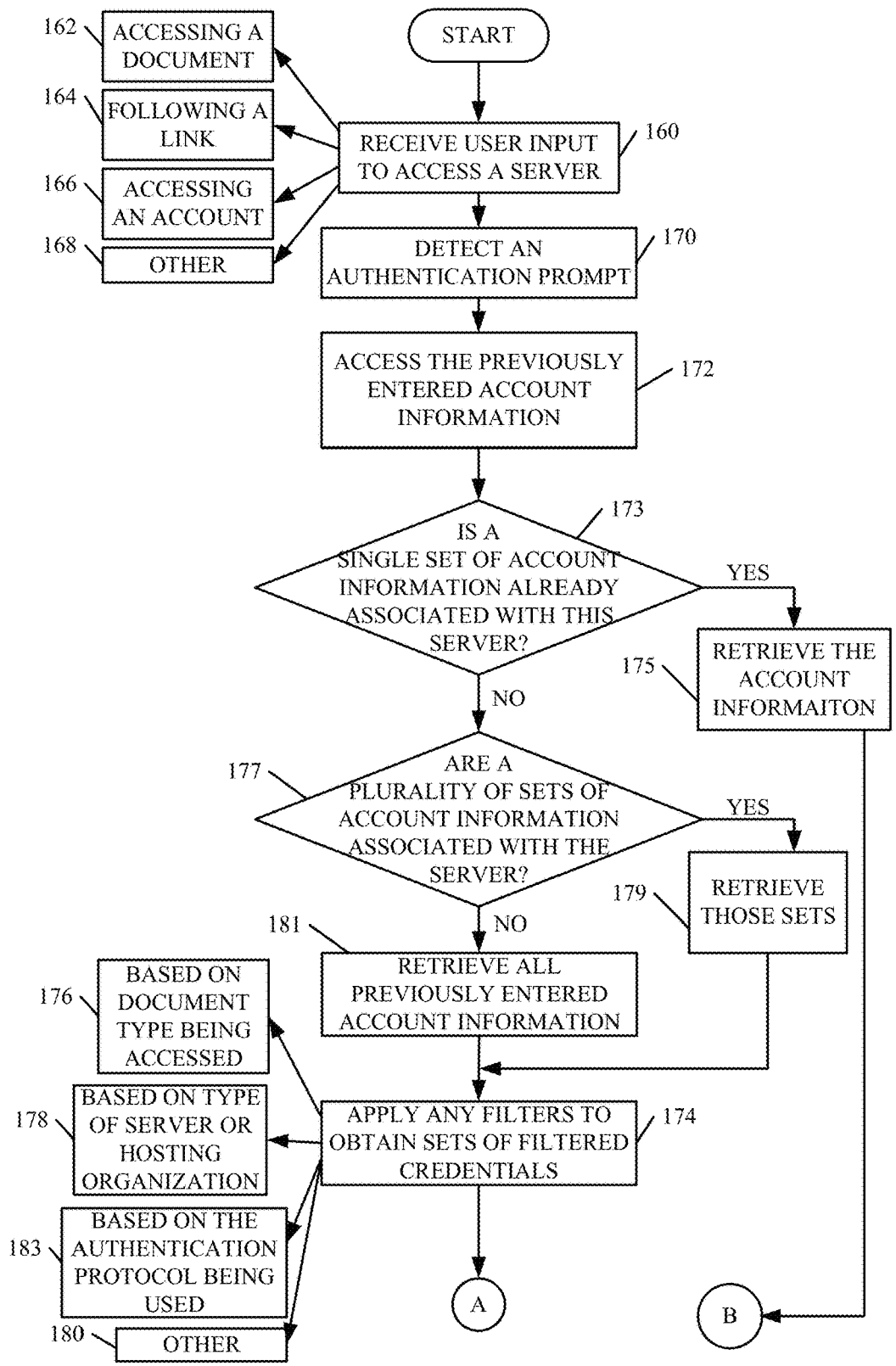
Figure 2:
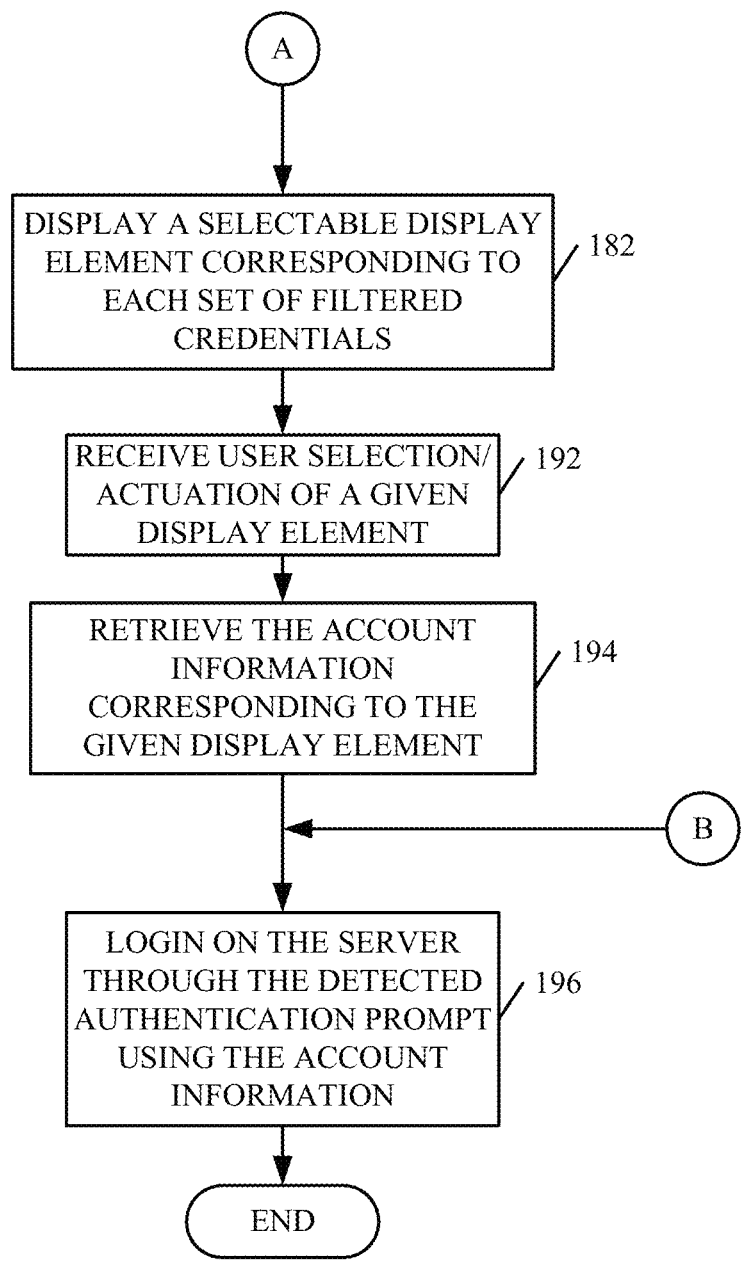
Figure 2A:
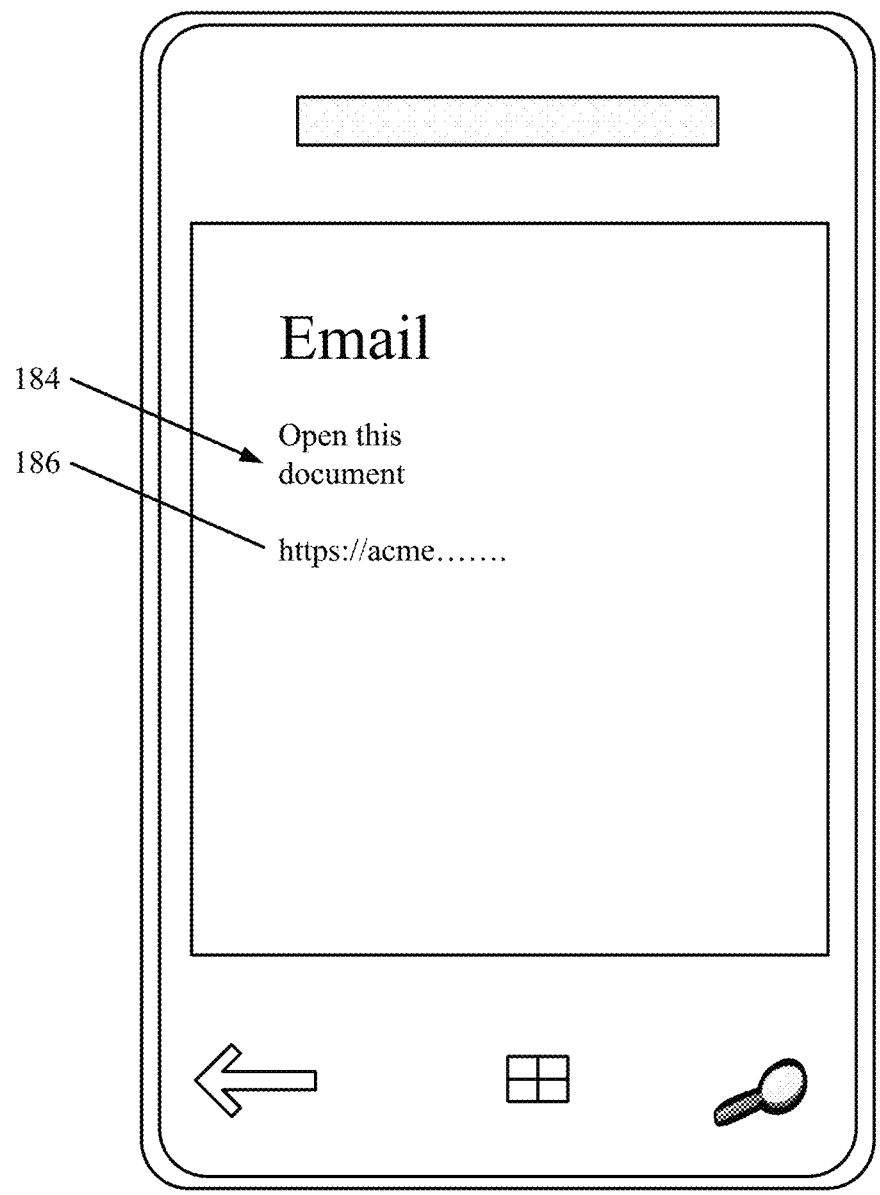
FIGS. 2A-2B show examples of user interface displays.
Figure 2B:
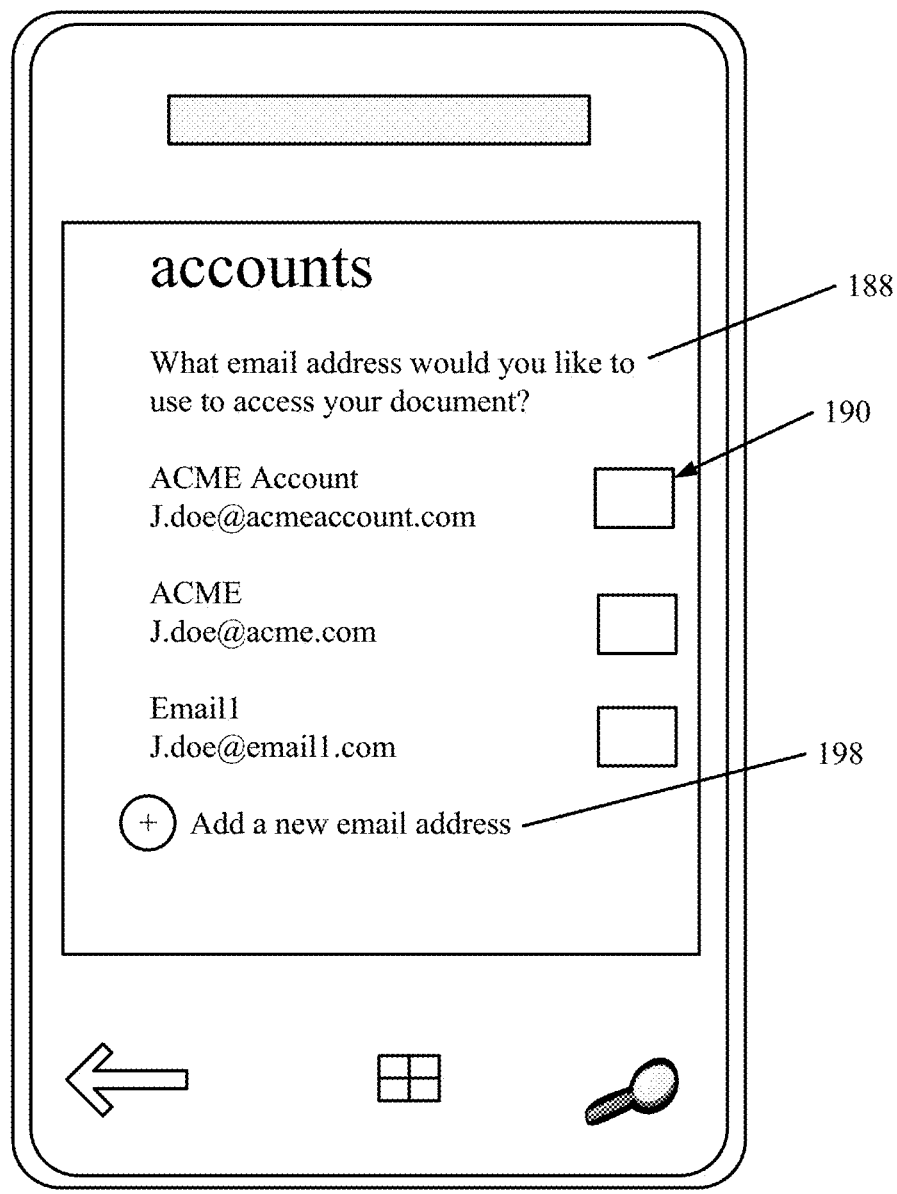

FIGS. 2-1 and 2-2 (collectively referred to as FIG. 2) show a flow diagram illustrating one example of the operation of account picker system 130 in letting a user pick an account for authentication. FIGS. 2A and 2B illustrate examples of user interface displays that can be generated on the display device 118 of mobile device 106. FIGS. 1-2B will now be described in conjunction with one another.

It is first assumed with respect to FIG. 2 that user 114 has already entered authentication information for some purpose in FIG. 1. How the user enters account information and associates it with a server is described in greater detail below with respect to FIGS. 3-3F. Suffice it to say, for now, that the user has already entered account information. Mobile device 106 then receives a user input indicating that the user wishes to access a server system (e.g., server system 102). This is indicated by block 160 in FIG. 2. This can be done in a wide variety of different ways. For instance, it may be that user 114 is attempting to access a document in a document management system deployed on server system 102. This is indicated by block 162. The user 114 may also have received an electronic mail message with a link to a document in server system 102. This is indicated by block 164. User 114 may simply be attempting to access his or her account on server system 102 for other reasons, and this is indicated by block 166. Of course, the user input to access server system 102 can be provided in other ways as well, and this is indicated by block 168.

In response, the server system 102 illustratively issues an authentication prompt to the user, asking the user to enter user credentials, or account information to access the server. In response, authentication detector 140 illustratively detects the authentication prompt, and this is indicated by block 170 in FIG. 2.

Picking component 142 then accesses the previously-entered account information. This is indicated by block 172. In one example, picking component 142 illustratively accesses mapping 125 in data store 124 that maps account information to different servers, to determine whether the user has already associated any account information with this server system. It will be noted, for instance, that user 114 may only associate a subset of his or her account information with a given server. In one example, user 114 may associate only a single set of account information with a server. In another example, for instance, where a user needs to use a work account to access certain documents, but may use a personal account to access other documents, the user may associate multiple sets of account information with a single server. In any case, mapping 125 illustratively identifies all of the different sets of secure account information 126-128 that are associated with the server that issued the authentication prompt, if any.

If there is only one set of account information associated with the server, then it is retrieved and used for authentication. This is indicated by blocks 173 and 175.

However, if more than one set of account information is associated with the server, then those sets of account information are retrieved so the user can select which set is to be used for authentication. This is indicated by blocks 177 and 179.

If the user has not associated any sets of account information with the server, but has entered account information for other reasons, then all previously-entered account information is retrieved. This is indicated by block 181 in FIG. 2.

In one example, account filter component 148 filters the sets of account information so that only a filtered group of different sets of account information (or filtered group of credentials) is identified. Applying a filter to obtain a group of filtered credentials is indicated by block 174. Filtering can be performed in many different ways using a wide variety of filter criteria. It may be, for instance, that account filter component 148 can be configured to filter the various sets of account information based upon the type of document that the user is attempting to access on server 102. If the type of document is a spreadsheet application, this may indicate that user 114 needs a set of credentials associated with his or her work account or organization account in order to access the document. Thus, filter component 148 can filter the sets of account information 126-128 that are associated with server 102 to only identify those corresponding to work accounts. This is only one example, and it is indicated by block 176.

In another example, filter component 148 may filter the account information based upon the particular application, type of server, or hosting organization that issued the authentication prompt. This is indicated by block 178.

In another example, authentication detector 140 detects the authentication protocol being used by the server that issued the prompt. For instance, the protocol may be an open standard authorization protocol or any of a variety of proprietary or other protocols. In that case, filter component 148 can filter the account information to identify only that information that has credentials that can be used with the detected authentication protocol. This is indicated by block 183

Of course, filter component 148 can filter the account information based on other filter criteria as well. This is indicated by block 180.

Picking component 142 then generates a user interface display displaying a set of selectable display elements. In one example, there is a selectable display element corresponding to each of the sets of account information that was identified by mapping 125, or corresponding to each set of previously-entered account information. In the example in which filter component 148 applies a filter, a selectable display element is displayed for each set of filtered credentials. Displaying the selectable display elements is indicated by block 182 in FIG. 2.

FIGS. 2A and 2B illustrate two different user interface displays to indicate this. FIG. 2A, for instance, shows that user 114 has accessed a server system that supports an e-mail server and has opened an e-mail message. The message is shown generally on user interface display 184. The e-mail message, itself, illustratively includes a link 186 to a word processing document that is stored on a document management system in server system 102.

When the user actuates link 186 (such as by touching it on a touch sensitive screen or otherwise), the document management system illustratively generates an authentication prompt, and this is detected by authentication detector 140. In response, picking component 142 identifies the various accounts that the user can pick from, to use for authentication. It then displays a selectable display element corresponding to each identified set of account information. This is illustrated in FIG. 2B.

FIG. 2B, for instance, shows user interface display 188 which shows a set of selectable display elements 190, one selectable display element corresponding to each set of account information that user 114 has previously entered The display elements, in the example shown in FIG. 2B, each have a check box associated with them so that the user can select one of the sets of account information by selecting the corresponding check box. For instance, if the document referenced by link 186 in FIG. 2A is a document for which user 114 is to enter his or her work credentials, the user can simply choose the display element in FIG. 2B corresponding to the user's work account.

Once user 114 selects one of the display elements 190, picking component 142 retrieves the corresponding account information from data store 124. Receiving user selection or actuation of a given display element is indicated by block 192 in FIG. 2, and retrieving the account information corresponding to the selected display element is indicated by block 194.

Auto-login component 146 then uses the retrieved information to automatically log in to server system 102, so that user 114 can successfully open the document referred to by link 186. Automatically logging into server system 102 and accessing and opening the document is indicated by block 196 in FIG. 2.

Referring again to FIG. 2B, if user 114 wishes to add additional account information for use in accessing the document, user 114 illustratively actuates user input mechanism 198. In that case, account picker system 130 illustratively navigates user 114 through a user experience that allows the user to do that. This is described in greater detail below with respect to FIGS. 3-3F.

Figure 3:
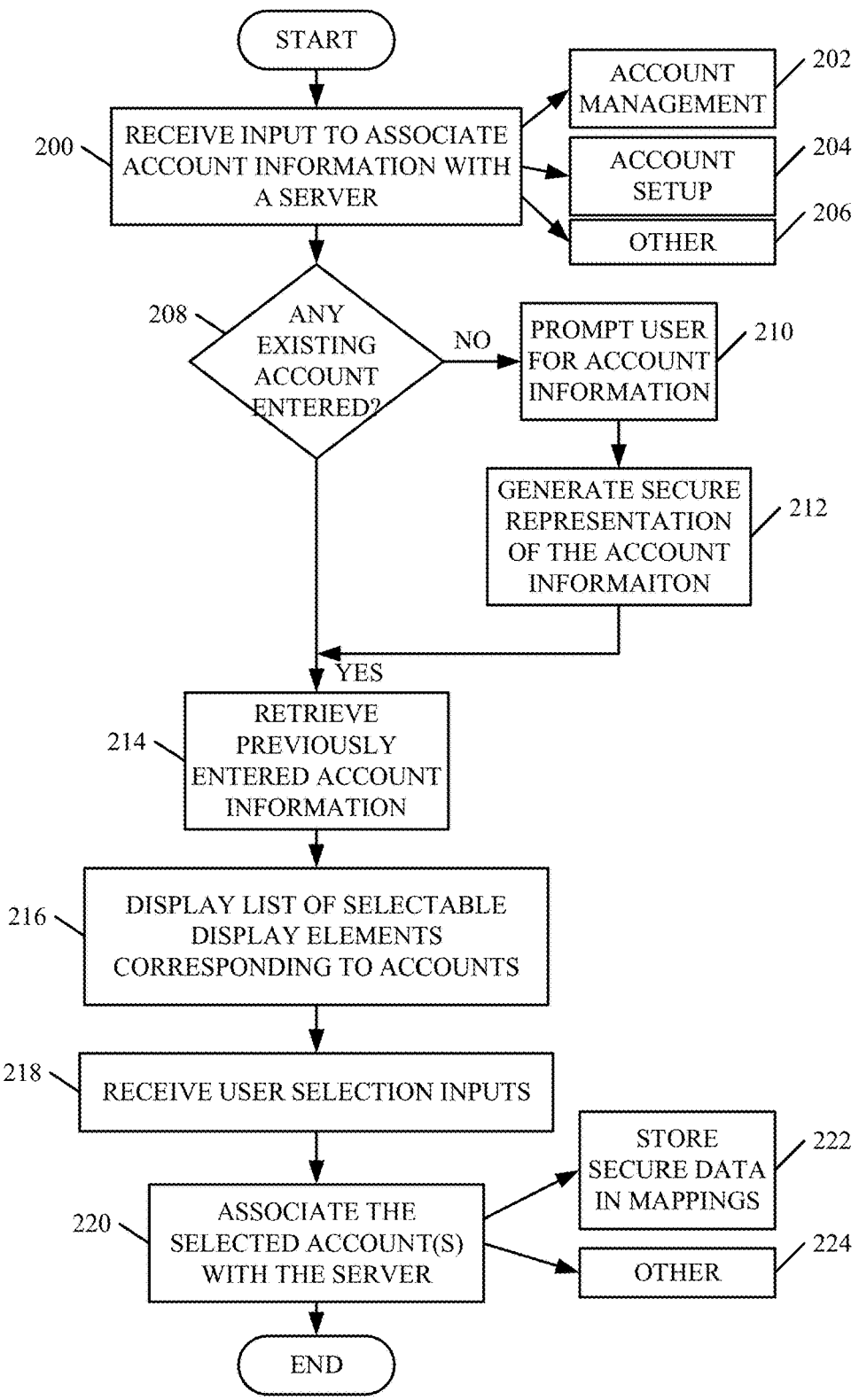
FIG. 3 is a flow diagram illustrating one example of the operation of the account picker system in allowing a user to associate account information with a server.

FIG. 3 is a flow diagram illustrating one example of the operation of account picker system 130 in allowing user 114 to perform account management tasks, such as changing accounts that he or she has associated with a server system, or such as initially setting up account picker system 130 to associate a given set of account information with a given server. FIGS. 3A-3F show examples of different user interface displays that indicate this. FIGS. 3-3F will now be described in conjunction with one another.

It is first assumed that user 114 provides a suitable user input to mobile device 106 that indicates that the user wishes to associate account information with a server. This is indicated by block 200 in FIG. 3. For instance, the user can provide an account management input in order to perform account management tasks. This is indicated by block 202. The user can access a settings menu within an application to perform account setup operations. This is indicated by block 204. The user can provide other inputs indicating that the user wishes to associate account information with the server as well, and this is indicated by block 206.

Account/server mapping component 144 then determines whether the user has ever entered any account information on device 106, or on any of the user's other devices, such as the user's desktop computer, tablet computer, mobile device, etc. The information can be stored in a location where it is accessible to all devices or it can be propagated to the devices or made available in other ways. This is indicated by block 208 in FIG. 3. If not, it illustratively prompts user 114 for the account information. This is indicated by block 210. For instance, it can prompt the user for a username and password, an e-mail address and password, or a host of other account information.

Security component 132 then generates a secure representation of the account information just entered. This is indicated by block 212. For instance, it can encrypt the information or perform other security operations to generate a secure representation of the information.

Returning again to block 208, if the user has already entered existing account information on device 106, picking component 142 retrieves the previously entered account information. This is indicated by block 214.

Picking component 142 then displays a list of selectable display elements corresponding to the account information that has been entered. This is indicated by block 216.

Account/server mapping component 144 then receives a user selection input selecting one or more of the selectable display elements. This is indicated by block 218. Component 144 then associates the selected account or accounts with the server. This is indicated by block 220. For instance, it can store the secure representation of the selected account information in mapping 125, that maps the account information to the server, in data store 124. This is indicated by block 222 in FIG. 3. It can associate the selected account or accounts with the server in other ways as well, and this is indicated by block 224.

Figure 3A:
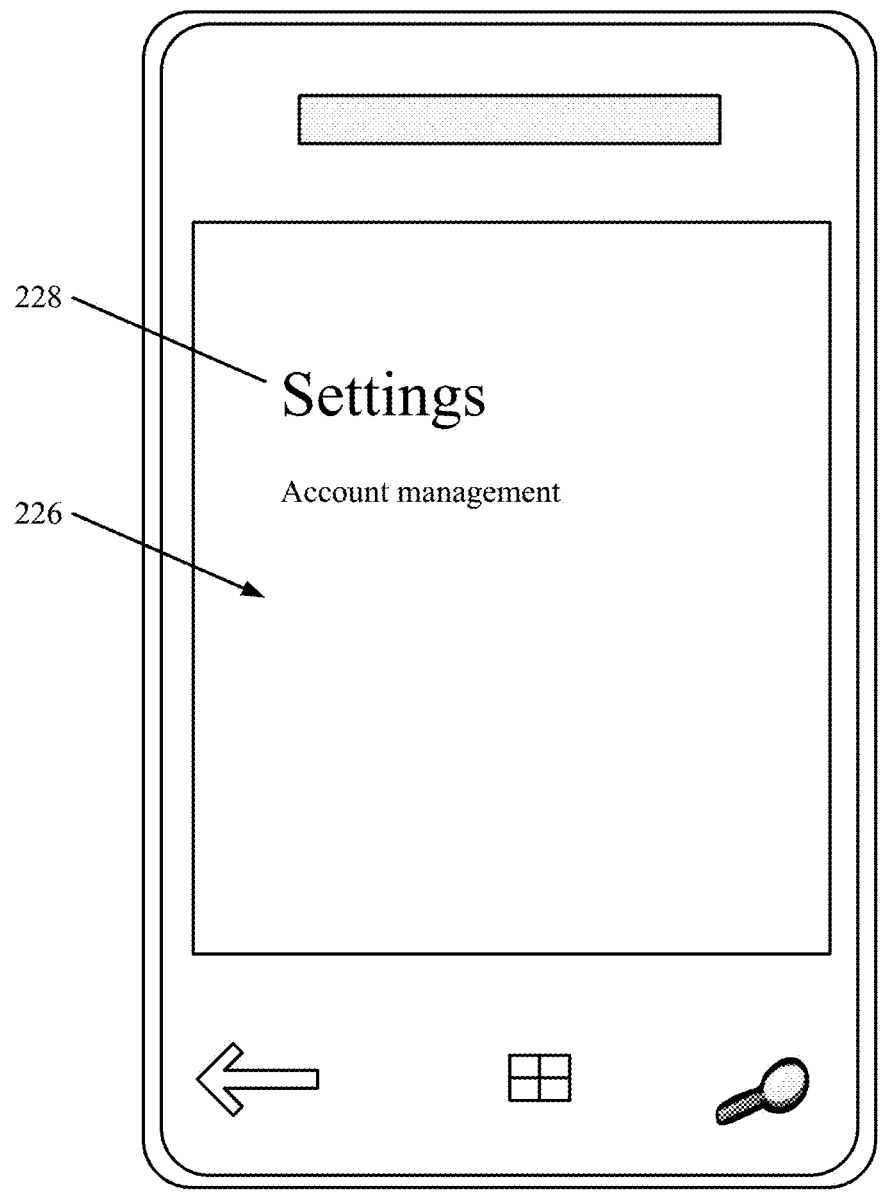
FIGS. 3A-3F show examples of various user interface displays.

FIG. 3A shows one example of a mobile device with a user interface display 226 that can be generated when the user is performing account management functions. It is assumed for the present example that the user has already entered existing account information. In that case, picking component 142 retrieves that account information and displays selectable display elements corresponding to each of the accounts, and prompts the user to select which of the sets of account information the user wishes to associate with the given server.

For instance, the user can navigate within an application to the settings menu where the application will display a user input mechanism 228 that can be actuated by the user to perform settings operations. When the user actuates this, account/server mapping component 144 illustratively generates a user interface display, such as user interface display 230 shown in FIG. 3B.

Figure 3B:
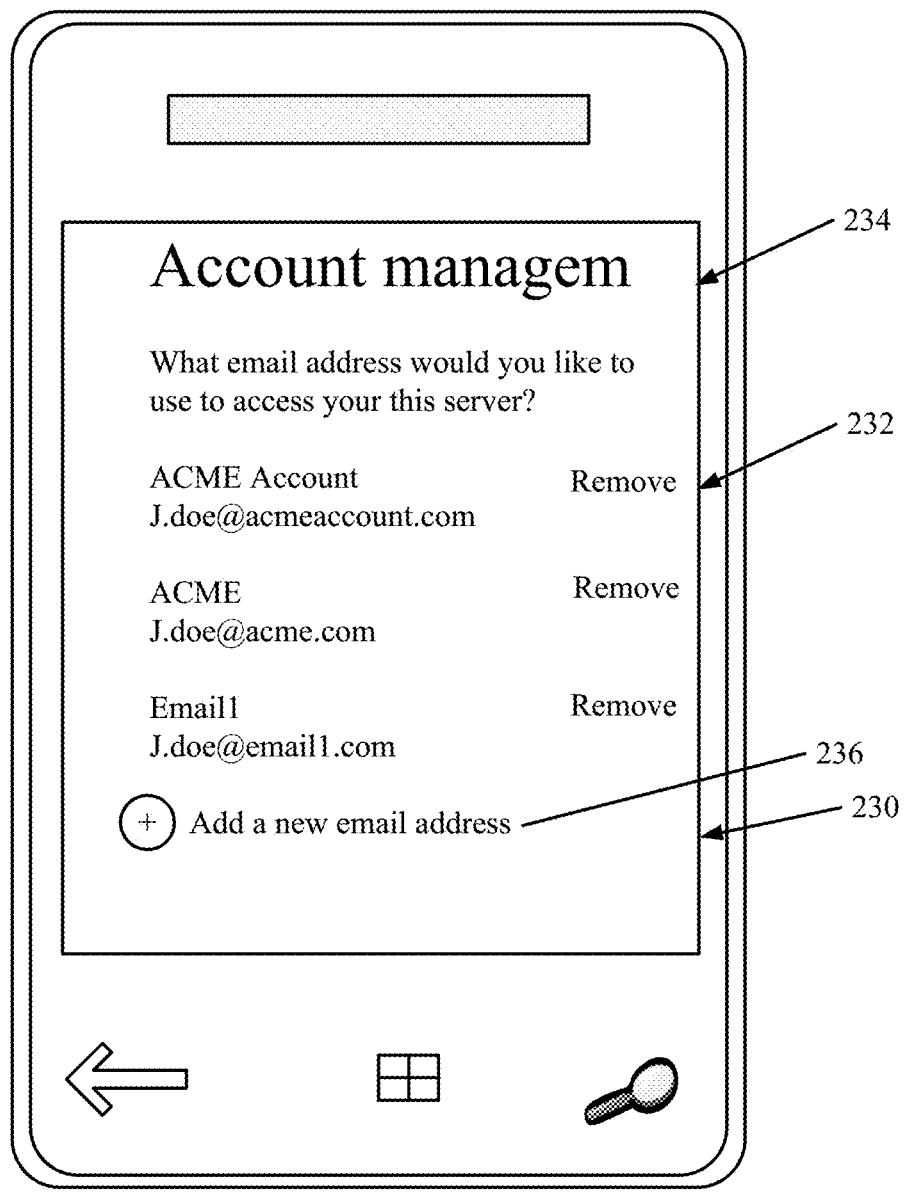

It can be seen in FIG. 3B that user interface display 230 illustratively includes a list of selectable display elements 232, each corresponding to a different set of account information that was already entered by the user. Display 230 also illustratively includes a prompt portion 234 that prompts the user to select one or more accounts that the user would like associated with this particular server. Again, if the user wishes to add additional account information, a user input mechanism 236 is provided. The user can actuate mechanism 236, and account picker system 130 will navigate the user through a user experience that allows the user to input additional account information.

If the user selects any of the display elements 232 in FIG. 3B, then account/server mapping component 144 illustratively associates the selected account information with the identified server. This can be done in mapping 125.

Figure 3C:
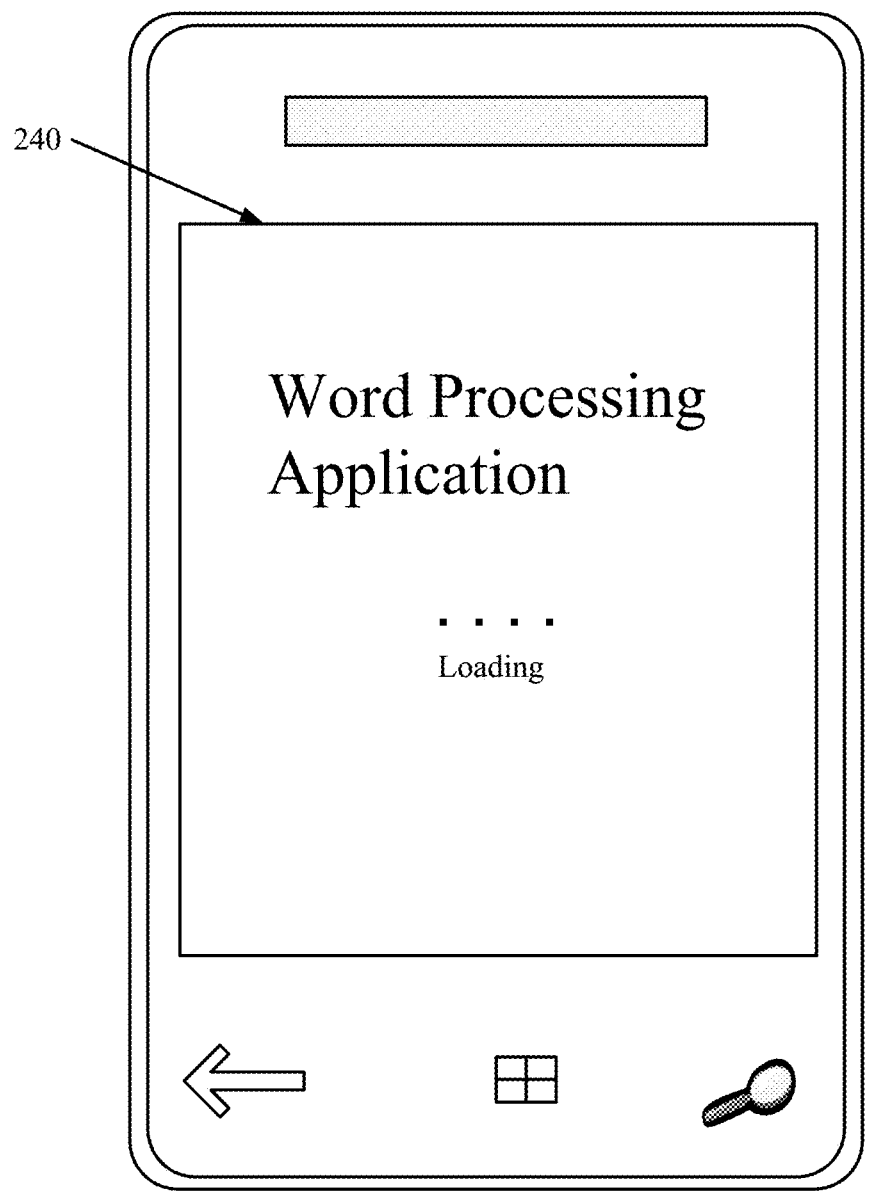
Figure 3D:
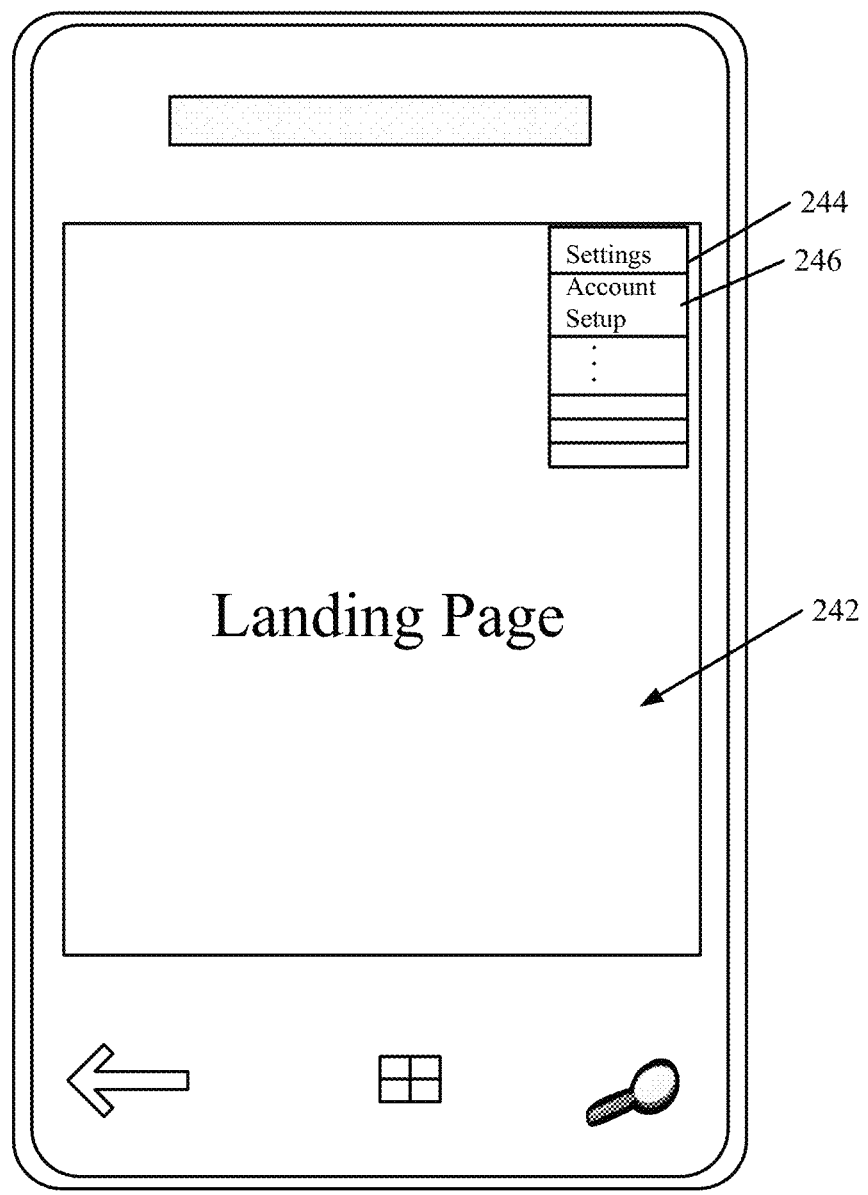
Figure 3E:
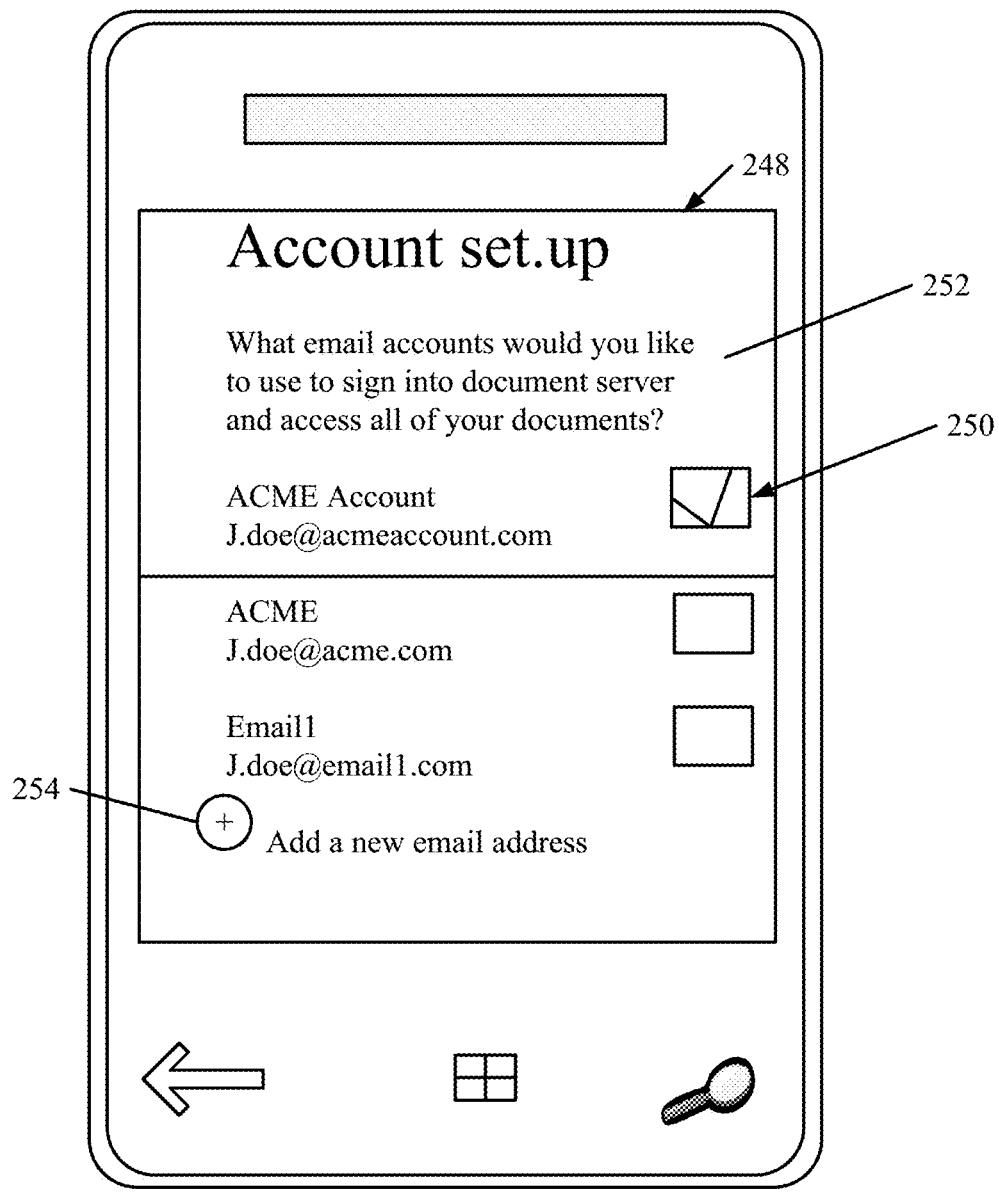
Figure 3F:
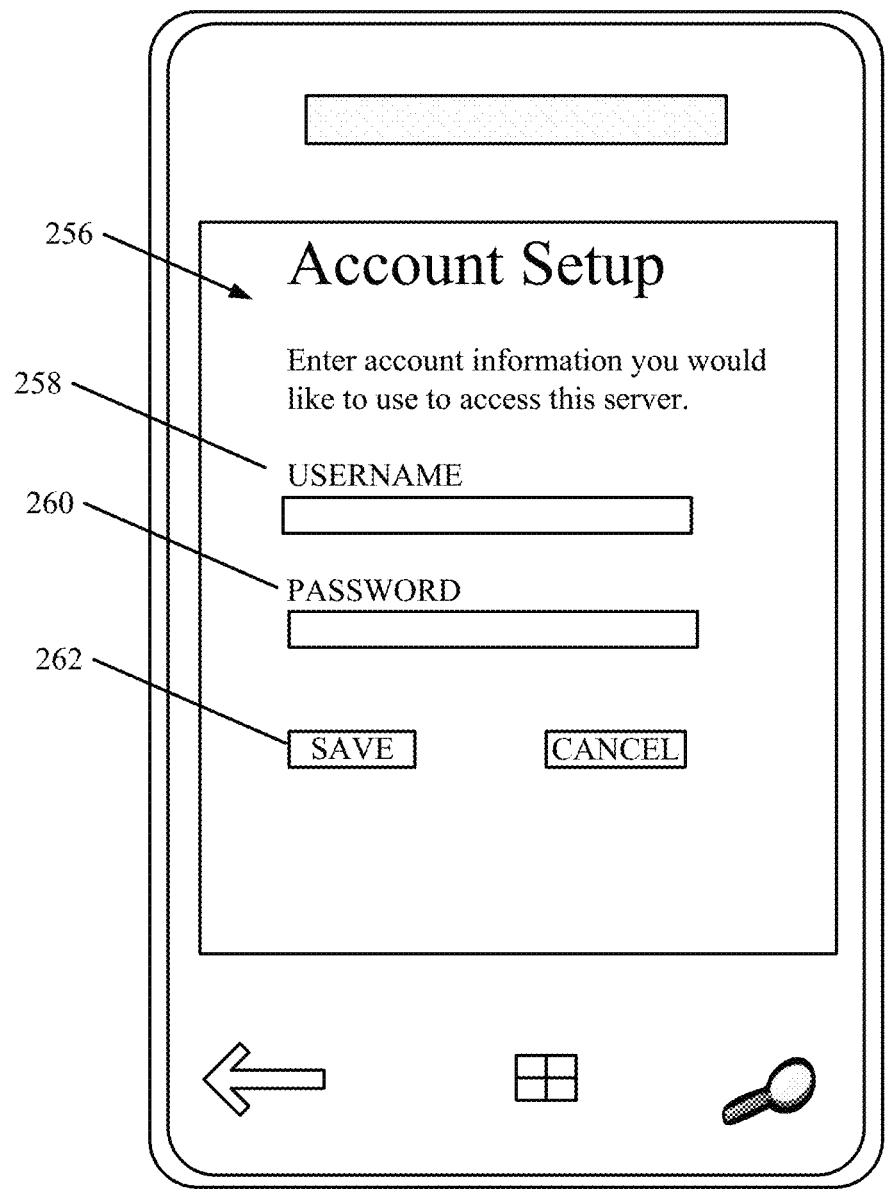

FIGS. 3C-3E show an example in which the user opens an application that is hosted on one of server systems 102-104, and navigates through the settings menu to an account setup display that allows the user to associate accounts with the server hosting the application. In the example shown in FIG. 3C, the user has launched a word processing application. Therefore, the mobile device in FIG. 3C generates a user interface display, such as that shown at 240, indicating that the mobile device is loading the word processing application.

The application then generates a landing page display, such as display 242 shown in FIG. 3D. In one example, the user can invoke a user input mechanism that allows the user to perform settings operations. For instance, the user can actuate a menu item from a command bar, from a ribbon, or the user can slide in a command bar (or pane) using a touch gesture, or otherwise. In any case, in one example, the application displays a settings user input mechanism 244 that can be actuated by the user to view an account setup user input mechanism 246. In the example shown in FIG. 3D, the account setup user input mechanism 246 is displayed in a dropdown menu when the user actuates the settings user input mechanism 244.

When the user actuates the account setup user input mechanism 246, the application illustratively displays an account setup display, such as display 248 shown in FIG. 3E. Again, picking component 142 accesses all of the previously entered account information and displays a corresponding, selectable, display element 250 along with a prompt 252 that asks the user to indicate which of the display elements the user wishes to use to access the server.

As with the display shown in FIG. 3D, the display shown in FIG. 3E also includes a user input mechanism 254. Mechanism 254 allows the user to add a new account, if desired.

In any of the examples shown in FIG. 2B, 3B or 3E, if the user accesses the user input mechanism to add a new account, account picker system 130 illustratively generates a user interface display, such as display 256 shown in FIG. 3F. The user interface display 256 illustratively includes user input mechanisms that allow the user to enter the new account information that the user wishes to have associated with the server. In the example shown in FIG. 3F, the user input mechanism includes a username input mechanism 258 and a password mechanism 260. The user can then actuate a save user input mechanism 262. This causes security component 132 to generate a secure representation of the account information. Account/server mapping component 144 then generates a mapping between that account information and the server.

It can be seen that the present system not only improves the performance of the mobile device, itself, but it also improves the performance of user 114. For instance, the system can surface all of the account information previously entered so the user can simply pick one set, for authentication, without needing to re-enter it. In one example, because the system allows the user to associate a plurality of a different sets of account information with a single server, the system surfaces the relevant account information more quickly than if the user needs to search through all of the different sets of account information ever used by the user, some of which is not relevant. For instance, it may be that the user has 10 or more different sets of account information. However, since the user can associate a subset of that account information with a given server, the mobile device can more quickly and efficiently surface relevant information for the user, when the user is attempting to log on or sign into the server.

The user performance is also greatly improved. For instance, the user need not repeatedly enter usernames and passwords or other authentication information, which can be difficult and fatiguing, especially on a small screen device. Instead, the user can simply select an account, from a list of accounts that the user has already entered. This greatly improves the user experience and improves the efficiency with which the user can access relevant information on a variety of different servers.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Further, where the device supports it (such as where a natural user interface is used), they can be actuated using three dimensional gestures (such as swipe, hover, etc.). Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 4:
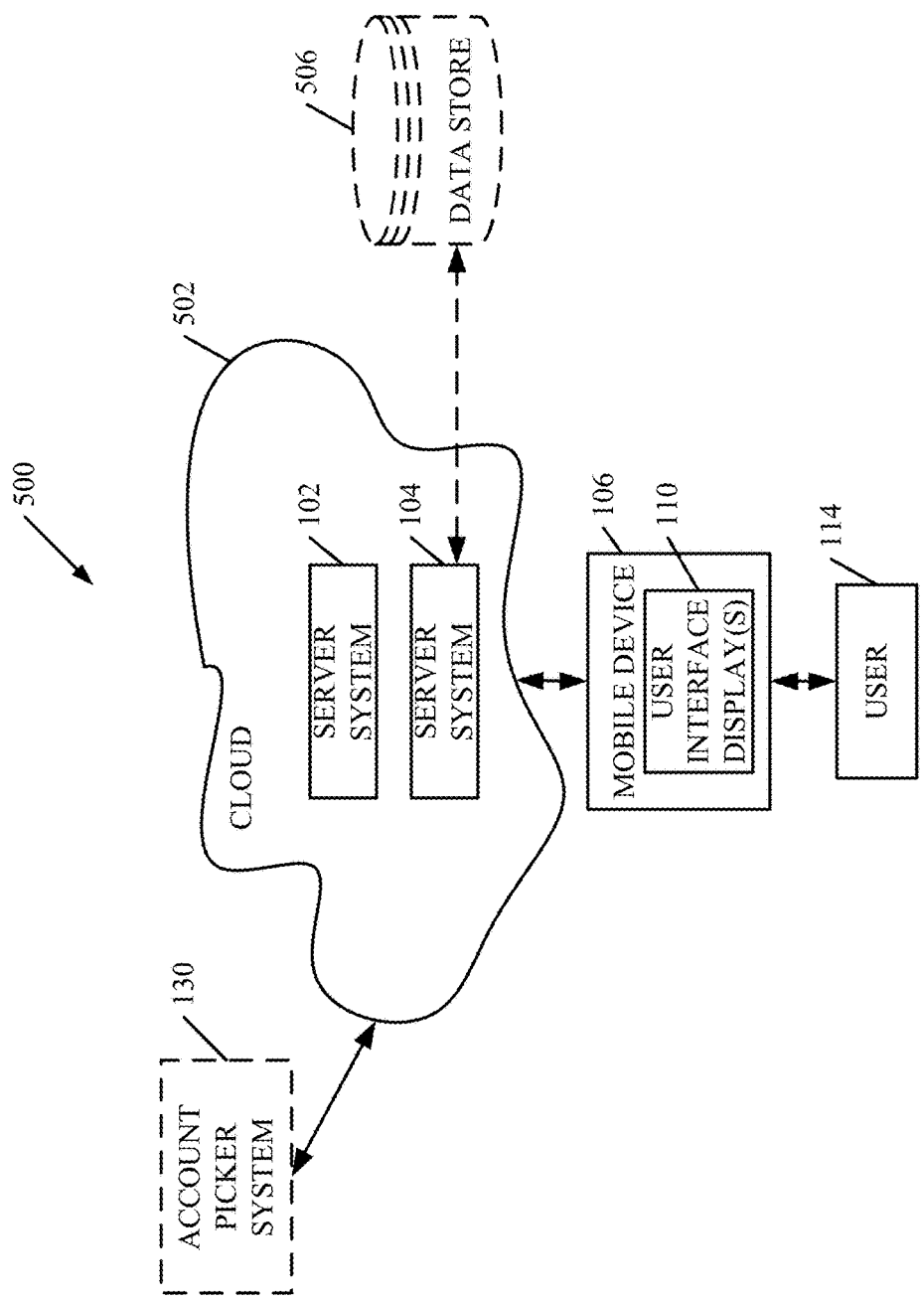
FIG. 4 shows one example of the architecture illustrated in FIG. 1, deployed in a cloud computing architecture.

FIG. 4 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 4, some items are similar to those shown in FIG. 1 and they are similarly numbered. FIG. 4 specifically shows that server systems 102-104 can be located in cloud 502 (which can be public, private, or a combination where portions are public while others are private). Therefore, user 114 uses mobile device 106 to access those systems through cloud 502.

FIG. 4 also depicts another example of a cloud architecture. FIG. 4 shows that it is also contemplated that some elements of architecture 100 are disposed in cloud 502 while others are not. By way of example, the data store 506 for one or more server systems can be disposed outside of cloud 502, and accessed through cloud 502. In another example, account picker system 130 can be outside of cloud 502. Regardless of where they are located, they can be accessed directly by device 106, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
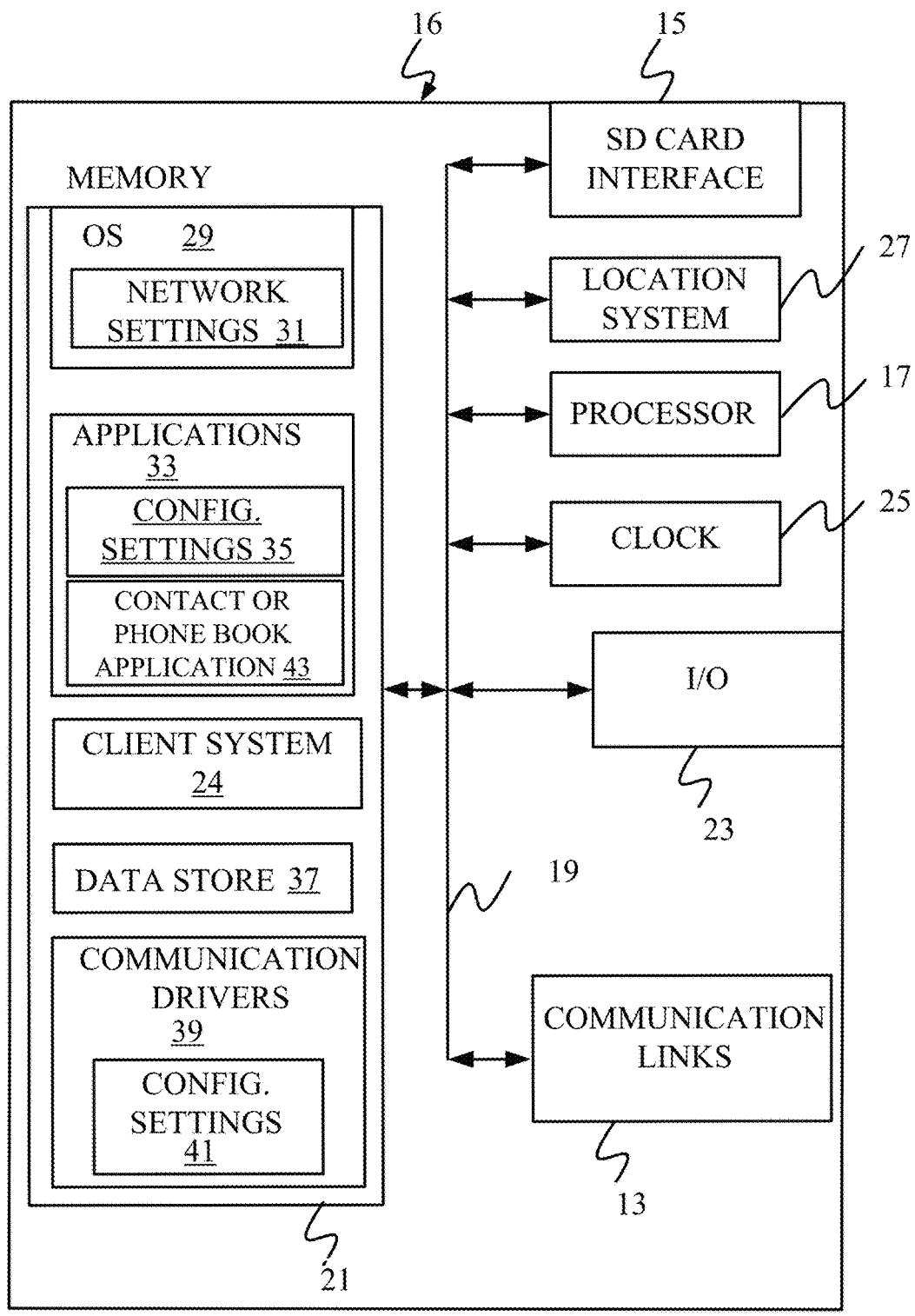
FIGS. 5-7 show various examples of mobile devices.
Figure 6:
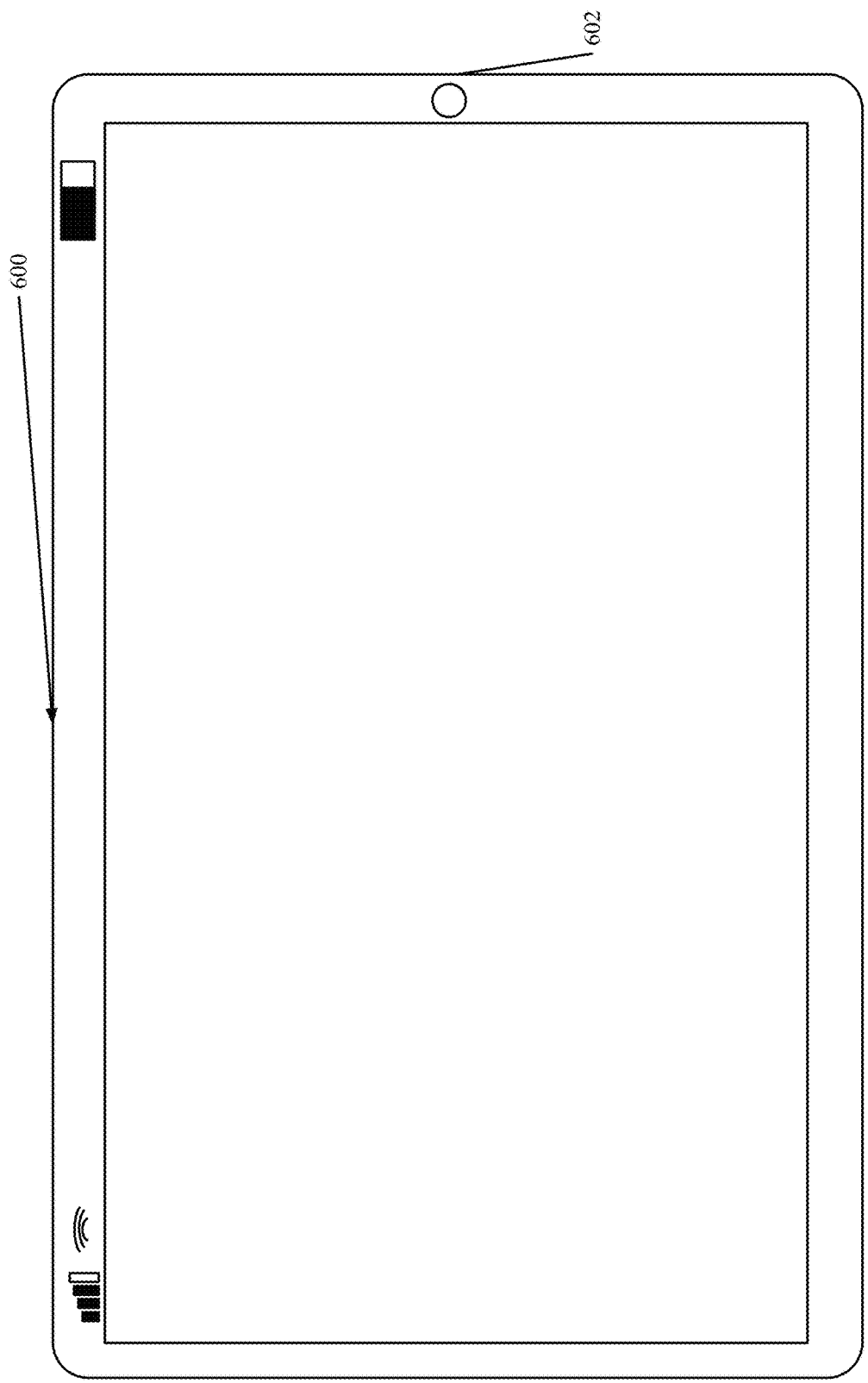
Figure 7:
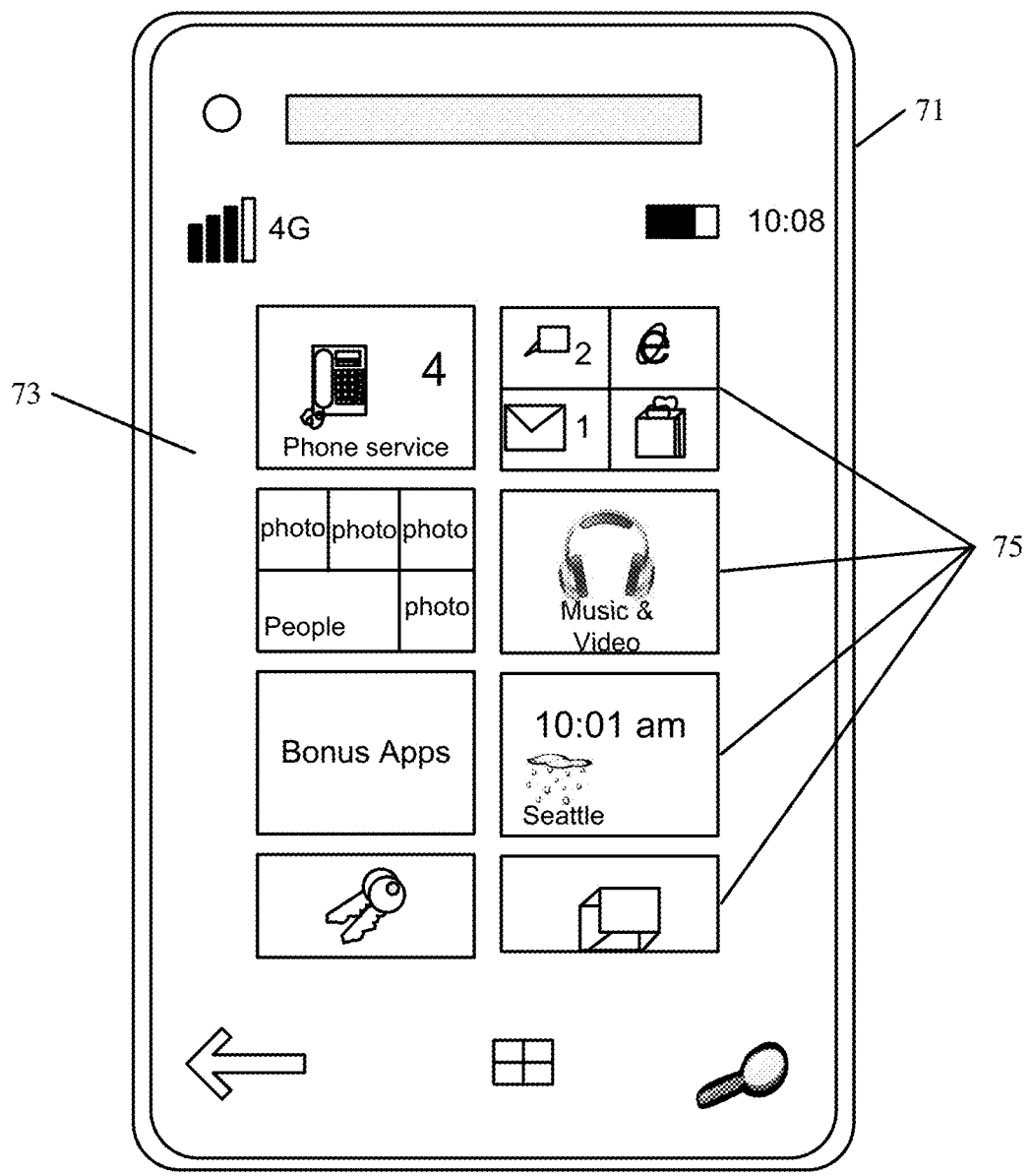

FIG. 5 is a simplified block diagram of one illustrative embodiment of a handheld or mobile computing device that can be used as a user's or client's hand held device or mobile device 16, in which the present system (or parts of it) can be deployed. FIGS. 6-7 are examples of handheld or mobile devices.

FIG. 5 provides a general block diagram of the components of a client device 16 that can run components of, or that interacts with architecture 100, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of tenant 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be is a personal digital assistant (PDA) or a multimedia player or a tablet computing device, etc. (hereinafter referred to as PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. The PDA can also include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 7 shows an example in which the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
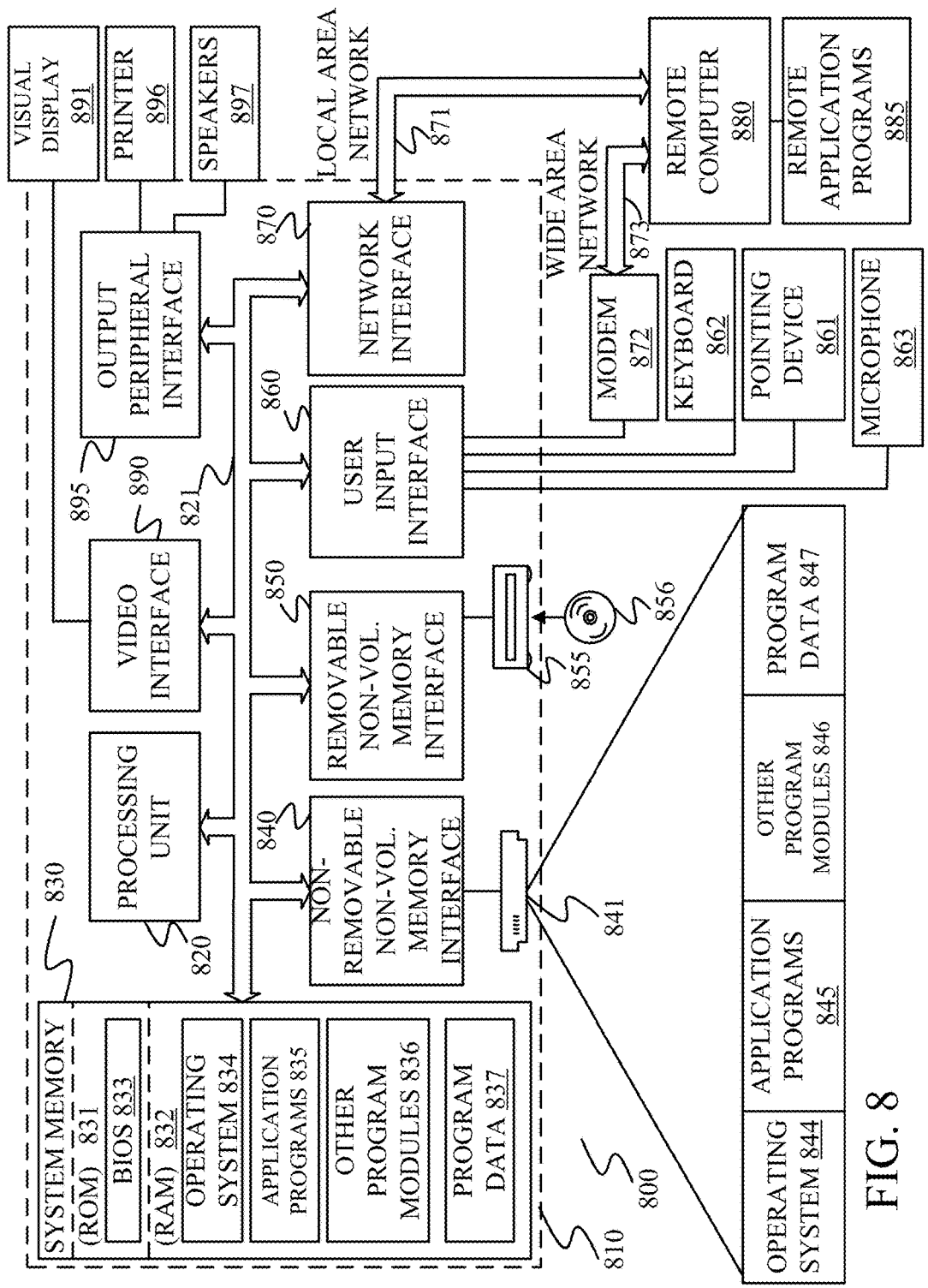
FIG. 8 is a block diagram of one example of a computing environment.

FIG. 8 is one embodiment of a computing environment in which architecture 100, or parts of it, (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processor 116 or those in server systems 102-104), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a mobile device, comprising:

an authentication detector that detects an authentication prompt from a server;

a picking component that identifies any sets of authentication information previously entered and displays a selectable display element corresponding to each identified set of authentication information; and a login component that receives a user selection input selecting a display element and automatically responds to the authentication prompt from the server using the authentication information corresponding to the selected display element.

Example 2 is the mobile device of any or all previous examples and further comprising:

an account filter component that filters the sets of authentication information for which a selectable display element is displayed, based on filter criteria.

Example 3 is the mobile device of any or all previous examples wherein the mobile device receives the authentication prompt in response to the mobile device attempting to access an item on the server, and wherein the account filter component filters the sets of authentication information based on a type of the item.

Example 4 is the mobile device of any or all previous examples wherein the mobile device receives the authentication prompt in response to the mobile device attempting to access an item on the server, and wherein the account filter component filters the sets of authentication information based on a characteristic of the authentication information.

Example 5 is the mobile device of any or all previous examples and further comprising:

a mapping component that generates a user interface display with a user input mechanism that is actuated to associate a set of previously-entered authentication information with the server.

Example 6 is the mobile device of any or all previous examples wherein the mapping component identifies all sets of previously-entered authentication information and generates a list of selectable display elements corresponding to the sets of previously-entered authentication information, along with an association prompt prompting user selection of display elements to be associated with the server.

Example 7 is the mobile device of any or all previous examples wherein the mapping component receives user selection inputs selecting at a selectable display element from the list and generates a map entry mapping the previously-entered authentication information, corresponding to the selected display element, to the sever.

Example 8 is the mobile device of any or all previous examples wherein the mapping component generates a user interface display with a new information input mechanism actuated to enter new authentication information and map it to the server.

Example 9 is the mobile device of any or all previous examples and further comprising:

a security component that generates an encrypted representation of the new authentication information, the mapping component generating a map entry mapping the new authentication information to the server, using the encrypted representation.

Example 10 is the mobile device of any or all previous examples and further comprising:

a data store, storing a mapping with the map entry.

Example 11 is a method, comprising:

detecting an authentication prompt from a server;

displaying a plurality of selectable display elements, each corresponding to a set of account information previously entered;

receiving a user selection input selecting a given display element; and automatically responding to the authentication prompt using the set of account information corresponding to the given display element.

Example 12 is the method of any or all previous examples wherein displaying a plurality of selectable display elements comprises:

accessing a mapping between the sets of account information and the server to identify which sets of account information are mapped to the server; and displaying one of the selectable display elements for each identified set of account information.

Example 13 is the method of any or all previous examples and further comprising:

displaying an association user input mechanism, actuated to associate a set of previously-entered account information with the server; and generating a mapping between the set of previously-entered account information and the server.

Example 14 is the method of any or all previous examples and further comprising:

displaying a new account user input mechanism, actuated to input a set of new account information and associate the set of new account information with the server; and generating a mapping between the set of new account information and the server.

Example 15 is the method of any or all previous examples wherein generating a mapping comprises:

generating a secure representation of the new account information; and generating the mapping using the secure representation of the new account information.

Example 16 is a mobile device, comprising:

a mapping component that identifies a plurality of sets of previously-entered authentication information and generates a mapping user interface display with a mapping user input mechanism that is actuated to map a subset of the plurality of sets of previously-entered authentication information to a server; and a picker system that detects an authentication prompt from the server, accesses the mapping, and displays a picker user interface display with a plurality of selectable display elements, a different selectable display element corresponding to each identified set of previously-entered authentication information in the subset.

Example 17 is the mobile device of any or all previous examples wherein the picker system comprises:

an automatic login component that obtains authentication information corresponding to a selected one of the different selectable display elements and automatically responds to the detected authentication prompt with the obtained authentication information.

Example 18 is the mobile device of any or all previous examples and further comprising:

a filter component that filters the sets of previously entered authentication information in the subset, based on filter criteria, to obtain identified sets of previously-entered authentication information in the subset, the picker system displaying the selectable display elements for only the identified sets of previously-entered authentication information in the subset.

Example 19 is the mobile device of any or all previous examples and further comprising:

a data store that stores the mapping.

Example 20 is the mobile device of any or all previous examples wherein the mapping component generates a new account entry display with a user input mechanism that is actuated to enter authentication information for a new account and map it to the server, and further comprising:

a security system that encrypts the authentication information for the new account to obtain encrypted authentication information, the mapping component generating a mapping between the new account and the server using the encrypted authentication information.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the processor, wherein the instructions configure the computing system to:
  detect an authentication prompt from a server;
  access a collection of authentication information associated with a user; and
  in response to a determination that the authentication information in the collection is not associated with the server,
    generate a filter criterion based on the authentication prompt from the server;
    identify one or more sets of authentication information by filtering the collection of authentication information based on the filter criterion, wherein the one or more sets comprise some, but not all, of the collection of authentication information;
    for each particular set of authentication information in the one or more sets, generate a selectable display element corresponding to the particular set of authentication information;
    generate a user interface display that displays the one or more selectable display elements;
    receive a user selection input selecting one of the display elements; and
    automatically respond to the authentication prompt from the server using the set of authentication information that corresponds to the selected display element.

2. The computing system of claim 1, wherein the server comprises a target server, and the one or more sets of authentication information are associated with one or more other servers, other than the target server.

3. The computing system of claim 1, wherein the instructions configure the computing system to:
in response to a determination that a single set of authentication information in the collection is associated with the server, automatically respond to the authentication prompt using the single set of account information.

4. The computing system of claim 1, wherein the instructions configure the computing system to:
identify an authentication protocol corresponding to the authentication prompt, wherein the filter criterion is based on the authentication protocol.

5. The computing system of claim 1, wherein the authentication prompt is associated with an item on the server, and the filter criterion is based on a type of the item.

6. The computing system of claim 1 wherein the instructions configure the computing system to:
generate a user interface display with a user input mechanism that represents the set of authentication information that corresponds to the selected display element; and
based on actuation of the user input mechanism, associate the set of authentication information with the server.

7. The computing system of claim 1, wherein the collection comprises sets of previously-entered authentication information, and wherein the instructions configure the computing system to:
access mapping information that maps each set of the previously-entered authentication information to a particular server; and
determine whether any of the authentication information in the collection is associated with the server based on the mapping information.

8. The computing system of claim 7, wherein the instructions configure the computing system to:
generate a user interface display with a new information input mechanism;
based on actuation of the new information input mechanism, define new authentication information; and
modify the mapping information to map the defined new authentication information to the server.

9. The computing system of claim 8, wherein the instructions configure the computing system to:
generate an encrypted representation of the new authentication information;
generate a map entry mapping the new authentication information to the server, using the encrypted representation; and
store the map entry in a data store.

10. A computer-implemented method comprising:
detecting an authentication prompt from a server;
accessing account information associated with a user;
identifying, from the account information, a plurality of sets of the account information that are associated with the server;
based on the authentication prompt, identifying a filter criterion;
based on the filter criterion, filtering the plurality of sets of account information to select one or more of the sets, the one or more sets comprising some, but not all, of the plurality of sets;
for each particular set of account information in the one or more sets, generating a selectable display element corresponding to the particular set of account information;
generating a user interface display that displays the one or more selectable display elements;
receiving a user selection input selecting one of the display elements; and
automatically responding to the authentication prompt from the server using the set of account information that corresponds to the selected display element.

11. The computer-implemented method of claim 10, wherein the filter criterion is based on at least one of:
an authentication protocol corresponding to the authentication prompt; or
an item on the server for which access is requested.

12. The computer-implemented method of claim 10, wherein accessing account information comprises:
accessing mapping information that maps the account information to one or more servers; and
based on the mapping information, identify the plurality of sets of account information mapped to the server.

13. The computer-implemented method of claim 12, and further comprising:
displaying an association user input mechanism; and
based on actuation of the association user input mechanism, modifying the mapping information to associate a set of previously-entered account information with the server.

14. The computer-implemented method of claim 12, and further comprising:
generating a user interface display with a new information input mechanism; and
based on actuation of the new information input mechanism, defining new authentication information; and
modifying the mapping information to map the defined new authentication information to the server.

15. A computing system comprising:
a processor; and
memory storing instructions executable by the processor, wherein the instructions configure computing system to:
detect an authentication prompt from a server;
access a collection of authentication information associated with a user;
determine whether any authentication information in the collection is associated with the server;
in response to a determination that only a single set of authentication information in the collection is associated with the server, automatically respond to the authentication prompt using the single set of authentication information; and
in response to a determination that a plurality of sets of authentication information in the collection are associated with the server,
generate a filter criterion based on the authentication prompt from the server;
apply the filter criterion to the plurality of sets to identify one or more sets of filtered authentication information;
for each particular set in the one or more sets of filtered authentication information, generate a selectable display element representing the particular set;
generate a user interface display that displays the selectable display elements;
receive a user selection input selecting one of the display elements; and
automatically respond to the authentication prompt from the server using the set of authentication information that corresponds to the selected display element.

16. The computing system of claim 15, wherein the filter criterion is based on at least one of:
an authentication protocol corresponding to the authentication prompt; or
an item on the server for which access is requested.

17. The computing system of claim 15, wherein the collection comprises sets of previously-entered authentication information, and wherein the instructions configure the computing system to:
access mapping information that maps each set of the previously-entered authentication information to a particular server; and
determine whether any authentication information in the collection is associated with the server based on the mapping information.

18. The computing system of claim 17, wherein the instructions configure the computing system to:
- generate a user interface display with a new information input mechanism; and
- based on actuation of the new information input mechanism, define new authentication information; and
- modify the mapping information to map the defined new authentication information to the server.

19. The computing system of claim 18, wherein the instructions configure the computing system to:
- generate a new account entry display with a user input mechanism that is actuated to enter authentication information for a new account and map it to the server;
- encrypt the authentication information for the new account to obtain encrypted authentication information; and
- generate a mapping between the new account and the server using the encrypted authentication information.

20. The computing system of claim 15, wherein the server comprises a target server, and the one or more sets of authentication information are associated with one or more other servers, other than the target server.

* * * * *